(12) United States Patent
Buck et al.

(10) Patent No.: US 12,147,865 B1
(45) Date of Patent: Nov. 19, 2024

(54) METHOD FOR IDENTIFYING A PHYSICAL OBJECT USING AN OBJECT IDENTIFICATION CODE

(71) Applicants: Michael Buck, Cologne (DE); Thomas Nieraad, Hofheim (DE); Carsten Kehrein, Koblenz (DE)

(72) Inventors: Michael Buck, Cologne (DE); Thomas Nieraad, Hofheim (DE); Carsten Kehrein, Koblenz (DE)

( * ) Notice: Subject to any disclaimer, the term of this patent is extended or adjusted under 35 U.S.C. 154(b) by 0 days.

(21) Appl. No.: 18/431,217

(22) Filed: Feb. 2, 2024

(51) Int. Cl.
  *G06K 19/10* (2006.01)
  *G06K 7/14* (2006.01)
  *G06K 19/06* (2006.01)

(52) U.S. Cl.
  CPC .......... *G06K 19/10* (2013.01); *G06K 7/1408* (2013.01); *G06K 19/06037* (2013.01)

(58) Field of Classification Search
  CPC .......... G06K 19/10; G06K 19/06; G06K 7/14
  See application file for complete search history.

(56) References Cited

U.S. PATENT DOCUMENTS

| | | | | |
|---|---|---|---|---|
| 6,678,864 B1 * | 1/2004 | Tsai | .................... | H04L 63/083 715/229 |
| 11,790,418 B1 * | 10/2023 | Jay | .................... | G06Q 30/0211 705/26.1 |
| 2019/0345488 A1 * | 11/2019 | Soumillon | .............. | C40B 70/00 |
| 2020/0387913 A1 * | 12/2020 | Miyano Neto | ........ | G06Q 10/08 |
| 2020/0392567 A1 * | 12/2020 | Bennett | ................ | C12Q 1/6825 |
| 2021/0142105 A1 * | 5/2021 | Siskind | ..................... | G06T 7/20 |
| 2021/0406868 A1 * | 12/2021 | Brightman | ....... | G06K 19/06037 |
| 2023/0058169 A1 * | 2/2023 | Cella | ...................... | G06N 3/126 |
| 2023/0203475 A1 * | 6/2023 | Frudakis | ............ | C12N 15/1013 435/6.1 |
| 2023/0265416 A1 * | 8/2023 | Jensen | .................. | C12N 15/86 506/10 |

* cited by examiner

*Primary Examiner* — Thien M Le
(74) *Attorney, Agent, or Firm* — Blueshift IP; Robert Plotkin

(57) ABSTRACT

Disclosed is an object identification code attachable to a physical object as well as a corresponding method for identifying a physical object using the object identification code. The object identification code may comprise a plurality of machine-readable optical codes, wherein each of the plurality of optical codes may be configured to encode a unique identifier of the physical object, to be independently scannable by a camera of an electronic device, to cause upon being scanned an object identification procedure to be performed by an object identification application of the electronic device and to be dynamically linkable to each other to form a predetermined scan pattern for at least one of verifying authenticity of the physical object and/or reaching a target address associated with the physical object.

11 Claims, 10 Drawing Sheets

METHOD FOR IDENTIFYING A PHYSICAL OBJECT USING AN OBJECT IDENTIFICATION CODE

TECHNICAL FIELD

The present disclosure generally relates to the field of object identification using optical codes and more particularly to techniques for identifying a physical object using an object identification code comprising a plurality of machine-readable optical codes.

BACKGROUND

Machine-readable optical codes such as QR codes have become ubiquitous in modern society, finding applications across various industries, including marketing, logistics, data storage, manufacturing and many others.

Originally developed in Japan in the 1990s, QR codes have evolved into an integral part of everyday life, serving as efficient tools for storing information in a visually scannable pattern. Typically, QR codes encode data such as URLs, text, or numerical information, which users can access by scanning the code with a compatible device, typically a smartphone equipped with a camera.

While QR codes have proven to be invaluable in simplifying various processes, there are limitations to their current functionality. These include restricted data capacity, vulnerability to unauthorized access, easy to counterfeit and a lack of dynamic adaptability to changing circumstances. As technological demands increase and user expectations evolve, there is a need for improved object identification codes.

It is therefore an objective of the present disclosure to provide a method for identifying a physical object using an improved object identification code, thereby overcoming the above-mentioned disadvantages of the prior art at least in part.

SUMMARY OF THE DISCLOSURE

The objective is solved by the subject-matter defined in the independent claims. Advantageous modifications of embodiments of the present disclosure are defined in the dependent claims as well as in the description and the figures.

One aspect of the present disclosure relates to an object identification code attachable to a physical object. The object identification code may comprise a plurality of machine-readable optical codes. Each of the plurality of optical codes may be configured to encode a unique identifier of the physical object. Each of the plurality of optical codes may be configured to be independently scannable by a camera of an electronic device and to cause, upon being scanned, an object identification procedure to be performed by an object identification application of the electronic device. The optical codes may be configured to be dynamically linkable to each other to form a predetermined scan pattern for at least one of verifying authenticity of the physical object and/or reaching a target address associated with the physical object.

This way, an object identification code is provided which is forgery-proof. This allows to verify authenticity of the physical object and/or to control access to the target address so that only authorized users (e.g., the owner of the authentic object) can access the target address.

According to another aspect of the present disclosure, the optical codes may be arranged adjacent to each other. Additionally or alternatively, the plurality of optical codes may comprise at least a first optical code and a second optical code both required to be scanned during the object identification procedure according to the predetermined scan pattern. The first optical code and the second optical code may be arranged on the physical object such that when the first optical code is located within a scannable camera view of the electronic device, the second optical code is located outside of the scannable camera view of the electronic device. Additionally or alternatively, the optical codes may be arranged such that from a first view angle onto the object a first set of object-related codes is detectable and that from a second view angle onto the object a second set of object-related codes is detectable. The first and second set may be different or partially overlapping.

Arranging the optical codes adjacent to each other may allow to validate whether the optical codes scanned match a corresponding arrangement on the authentic physical object. For example, upon scanning an optical code it may also be determined whether the unique identifiers of its adjacent optical codes are the same as arranged on the authentic physical object. Requiring the scan of at least a first and second optical code improves the security of the object identification procedure. This is because photocopying one optical code is no longer sufficient as at least a second optical code is required. Arranging these two codes in a way that they are not together detectable within a scannable camera view further strengthens the systems security against photocopying. Combining the above-mentioned aspects, may result in a first and second set of optical codes arranged such that they not together detectable within the same camera view as well as using adjacent identifiers for validation.

According to another aspect of the present disclosure, the optical codes may be arranged in a ring shape to reach around the object. Alternatively, the optical codes may be arranged in another suitable shape to reach around the object.

This way, attachment of the object identification code is also possible on curved or otherwise uneven surfaces. Accordingly, at least one optical code may be detectable from each view angle onto the physical object which inter alia improves the usability to cause start of the object identification procedure by scanning any at least one of these codes.

According to another aspect of the present disclosure, a position of at least one optical code on the physical object may be associated with a visual cue of the physical object.

This way, another validation factor is provided which cannot be circumvented by simply photocopying the object identification code or one of the optical codes. This is because not only the code(s) are necessary but also how they are arranged on the physical object and with respect to corresponding visual cue(s) of the physical object. Because an attack does not know which position of which optical code is associated with which visual cue(s) of the physical object, the security of the object identification procedure is improved.

According to another aspect of the present disclosure, each optical code may comprise a first layer of identification marks configured to cause start of the object identification application upon being scanned and a second layer of identification marks configured to provide dedicated information for the object identification procedure upon being scanned.

The different layers of identification marks provide an additional safety mechanism to the object identification. Common codes which comprise only a single layer of identification marks suffer from the fact that an attacker can simply copy the code (e.g., by taking a photo) and thus has access to the target address encoded by the code. However, by adding different layers of identification marks an additional hurdle is implemented. For example, once a user scans at least one optical code, the first layer of identification marks causes the start of the object identification application (e.g., an app installed on a computing/electronic device and/or hosted on a server). This object identification performs an object identification procedure for which one or more additional scans are necessary. These scans may analyze the second layer of identification marks. For this reason, the second layer of identification marks may provide corresponding dedicated information for the object identification procedure which may determine whether the physical object is authentic and/or whether access to the target address should be granted by using this dedicated information. The fact that the logic for processing the dedicated information (i.e., how the dedicated information is used to determine whether the physical object is authentic and/or whether access should be granted) is only accessible for the object identification procedure and may also be dynamically changed (e.g., for each iteration/execution of the object identification procedure) prevents unauthorized access or counterfeiting.

According to another aspect of the present disclosure, the first layer of identification marks may be scannable by a common optical code scanner. Additionally or alternatively, the second layer of identification marks may only be scannable by an optical code scanner of the object identification application.

The fact that the first layer of identification marks may be scanned with a common optical scanner (e.g., no additional installations or the like are necessary) ensures scalability of the system as the complexity of the system architecture at least for the first scan is reduced. Implementing the second layer of identification marks in a way that they are only scannable by an optical scanner of the object identification application improves the systems security because only authorized users (e.g., user which are registered for the object identification application) may use the modified optical scanner of the object identification application (e.g., a scanner which has additional object recognition and/or detection capabilities as compared to a common optical scanner).

A further aspect of the present disclosure relates to a method for identifying a physical object using an object identification code according to any one of the aspects described herein. The method may comprise a step of receiving an indication that at least one of the optical codes was scanned. The method may comprise a step of causing, in response to receiving the indication, start of an object identification procedure according to a predetermined scan pattern for at least one of verifying authenticity of the physical object and/or reaching a target address associated with the physical object. The method may comprise a step of determining that the physical object is an authentic object and/or calling the target address if the object identification procedure is successful or determining that the physical object is an inauthentic object and/or not calling the target address if the object identification procedure fails.

As explained above, the object identification code is forgery-proof. This allows to verify authenticity of the physical object and/or to control access to the target address so that only authorized users (e.g., the owner of the authentic object) can access the target address.

According to another aspect of the present disclosure, the object identification procedure may comprises causing one or more prompts to scan one or more optical codes according to the predetermined scan pattern, which is dynamically configurable for linking the optical codes to each other. Additionally or alternatively, at least a first optical code and a second optical code may both be required to be scanned according to the predetermined scan pattern. The first optical code and the second optical code may be arranged on the physical object such that when the first optical code is located within a scannable camera view of an electronic device, the second optical code is located outside of the scannable camera view of the electronic device.

This way, additional safety mechanisms are provided which further improve the system security. For example, the prompts to scan one or more optical codes may prompt a user to rotate the physical object until the corresponding optical code is detected. An attacker which merely photocopied the object from a frontal view for example, may not have the object and also no copy of the object from behind and thus no copy of the one or more optical codes arranged on the backside of the object.

According to another aspect of the present disclosure, the object identification procedure further may comprise performing an object detection step to determine whether the detected physical object is the authentic object or the inauthentic object. The object detection step may comprise comparing one or more properties of the physical object with corresponding one or more properties of the authentic object.

This way, it can be determined whether the detected properties of the physical object scanned match with the corresponding one or more properties of the authentic object. This allows to determine whether the physical object is authentic (i.e., in case the properties match) or inauthentic (i.e., in case the properties do not match). This way, even if an attacker is able to photocopy all of the optical codes and even attaches them in a similar manner onto an (inauthentic) physical object, the object identification procedure performing the object detection step can still determine that the physical object is inauthentic. One reason is that chances of perfectly reconstructing the arrangement of optical codes on an inauthentic physical object are low. In addition, authentic physical objects may be configured with unique properties (e.g., during manufacturing of the physical objects) such that even a perfectly reconstructed arrangement of the copied optical codes cannot outwit the object identification procedure, because the compared properties do not match.

According to another aspect of the present disclosure, the object identification procedure may further comprise performing an object detection step to determine whether a specific optical code is arranged correctly on the physical object with respect to a visual cue of the physical object.

Because this specific arrangement is only known to the object identification procedure, an attacker when trying to outwit the system will fail because the attacker does not know which optical code is chosen, which visual cue is chosen and how the specific arrangement is defined.

According to another aspect of the present disclosure, the object identification procedure may further comprise receiving, when a second layer of identification marks of an optical code has been scanned, dedicated information for the object identification procedure. The object identification procedure may further comprise determining whether the physical object is the authentic or inauthentic object based on the dedicated information.

As explained above, the second layer of identification marks may provide corresponding dedicated information for the object identification procedure to determine whether the physical object is authentic and/or whether access to the target address should be granted by using this dedicated information. The fact that the logic for processing the dedicated information (i.e., how the dedicated information is used to determine whether the physical object is authentic and/or whether access should be granted) is only accessible for the object identification procedure and may also be dynamically changed (e.g., for each iteration/execution of the object identification procedure) prevents unauthorized access or counterfeiting.

According to another aspect of the present disclosure, the object identification procedure may further comprise transmitting a request to a non-visual mark which was attached to the authentic object. The object identification procedure may further comprise determining that the physical object is the authentic object if a response to the request is received.

This way, an additional safety mechanism is provided which further improves the overall system security. For example, the non-visual mark (e.g., an NFC tag) may transmit a corresponding response to the request transmitted by the object identification procedure. An inauthentic physical object may not have a corresponding non-visual mark attached to it and thus no response may be received indicating that the physical object is inauthentic. In addition, even if a non-visual mark would be attached to an inauthentic object, the object identification procedure may request a specific information (e.g., a unique ID of the non-visual mark) and compare whether the response comprises this specific information. Accordingly, even if the inauthentic object is equipped with a non-visual mark, the response would not comprise the requested specific information which allows the object identification procedure to determine that the physical object is inauthentic and/or deny access to the target address.

A further aspect of the present disclosure relates to an apparatus. The apparatus may comprise a memory and one or more processors, coupled to the memory. The one or more processors may be configured to receive an indication that at least one of a plurality of object-related codes was scanned. The one or more processors may be configured to cause, in response to receiving the indication, start of an object identification procedure according to a predetermined scan pattern for at least one of verifying authenticity of a physical object; and/or reaching a target address associated with the physical object. The one or more processors may be configured to determine that the physical object is an authentic object and/or calling the target address if the object identification procedure is successful or determine that the physical object is an inauthentic object and/or not calling the target address if the object identification procedure fails. The one or more processors may be further configured to perform the method according to any one of the aspects described herein.

A further aspect of the present disclosure relates to an apparatus comprising means for performing the method of any one of the aspects described herein.

A further aspect of the present disclosure relates to a non-transitory computer-readable medium storing a set of instructions that, when executed by one or more processors of an apparatus, cause the apparatus to receive an indication that at least one of a plurality of object-related codes was scanned, causing, in response to receiving the indication, start of an object identification procedure according to a predetermined scan pattern for at least one of verifying authenticity of a physical object; and/or reaching a target address associated with the physical object and determine that the physical object is an authentic object and/or calling the target address if the object identification procedure is successful or determine that the physical object is an inauthentic object and/or not calling the target address if the object identification procedure fails.

A further aspect of the present disclosure relates to a computer program comprising instructions which when executed by a computer cause the computer to perform the method of any one of the aspects described herein.

A further aspect of the present disclosure relates to a physical object with an attached object identification code according to any one of the aspects described herein and which is configured to be identified according to the method of any one of the aspects described herein.

This way, a physical object can be provided which is forgery-proof due to the technical advantages achieved by the above explained aspects.

BRIEF DESCRIPTION OF THE DRAWINGS

The disclosure may be better understood by reference to the following drawings.

DETAILED DESCRIPTION

In the following, representative embodiments illustrated in the accompanying drawings will be explained. It should be understood that the illustrated embodiments and the following descriptions refer to examples which are not intended to limit the embodiments to one preferred embodiment.

Figure 1A:
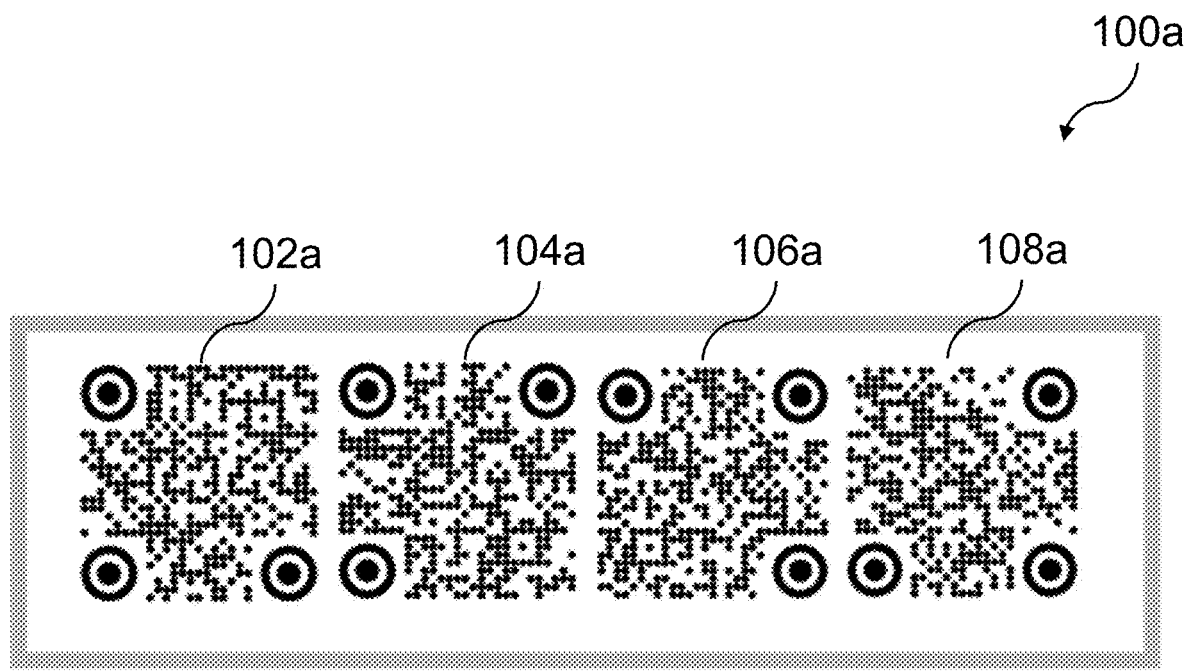
FIG. 1a: An exemplary object identification code in accordance with embodiments of the present disclosure.

FIG. 1a illustrates an exemplary object identification code 100a in accordance with an exemplary embodiment. The object identification code 100a may be attachable to a physical object. As can be seen, the object identification code 100a comprises four (i.e., a plurality) machine-readable optical codes 102a-108a. It may be preferred that the object identification code 100a comprises at least three optical codes. Each of the plurality of optical codes 102a-108a may be configured to encode a unique identifier of the physical object.

Each of the plurality of optical codes 102a-108a may be configured to be independently scannable by a camera of an electronic device and to cause, upon being scanned, an object identification procedure to be performed by an object identification application of the electronic device.

Even though these codes are independently scannable, they may also be scanned at once (i.e., using a corresponding optical scanner may allow to scan more than one optical code together at a time). The optical codes 102a-108a may be configured to be dynamically linkable to each other to form a predetermined scan pattern for at least one of verifying authenticity of the physical object and/or reaching a target address associated with the physical object.

In some implementations in which more than one optical code is scanned at a time, the scan pattern may also refer to a sequence of sets (i.e., two or more optical codes) according to which the optical codes have to be scanned (e.g., from a plurality of 4 codes, code 1 and code 2 (i.e., a first set) may have to be scanned before scanning codes 3 and 4 (i.e., a second set)).

As can be seen, the optical codes 102a-108a are arranged adjacent to each other. In this example, the optical codes 102a-108a are arranged adjacent to each to form a line of optical codes. Other types of forms are also possible and may depend on properties of the physical object (e.g., size, shape, object type etc.).

For example, optical code 102a may encode the unique identifier 1, optical code 104a may encode the unique identifier 2, optical code 106a may encode the unique identifier 3 and optical code 108a may encode the unique identifier 4. Accordingly, the predetermined scan pattern may link the optical codes as follows: 4-1-3-2. This means, that during the object identification procedure, the optical codes 102a-108a have to be scanned according to said pattern which represents a sequence of scans to be performed to verify that the physical object is authentic or to call/reach an encoded target address. It may also be possible that certain optical codes have to be scanned multiple times (e.g., 4-1-4-3-2-4-1-1).

These scan patterns may also be logged into a data storage (e.g., within the electronic device or at a remote server) to obtain traces which allow to track the performed scans. These traces may be seen as signatures wherein each signature is proof of one successfully performed object identification procedure on the physical object.

These traces/signatures may also comprise the unique identifier of the optical code scanned first to cause start of the application. This may serve as additional information usable for detecting a potential attempt to deceive the system. For example, if every trace/signature indicates that the object identification procedure was started with a scan of optical code 102a this may be seen as an indication that said code was photocopied as it is rather unlikely that a user scanning the authentic object would always scan the same optical code. In such a situation, the object identification application may issue a prompt to the user to scan a different optical code. Accordingly, tracking may provide additional information which can be used for validating (e.g., determine whether a certain scan pattern was performed suspiciously often, from different locations etc.).

It is to be understood that these identifiers are chosen only for illustration purposes and are not limiting. For example, the unique identifiers (UIDs) may also refer to unique URLs or the like. A unique URL may be created by generating a string such as "https://domain/UID/ . . . ". This way, optical codes cannot have the same URL and thus encode a unique identifier. This also means that there cannot exist two object identification codes comprising the same optical code.

Due to the fact that the optical codes 102a-108a are dynamically linkable, said scan pattern may be changed frequently. For example, the scan pattern may be changed for each performed object identification procedure wherein the first scan which causes the start of the object identification may be seen as a trigger for determining a new scan pattern (i.e., a new linking between the optical codes). The determining of the new scan pattern may be randomized. The more optical codes there are, the more combinations are possible which increases the robustness and security.

Figure 1B:
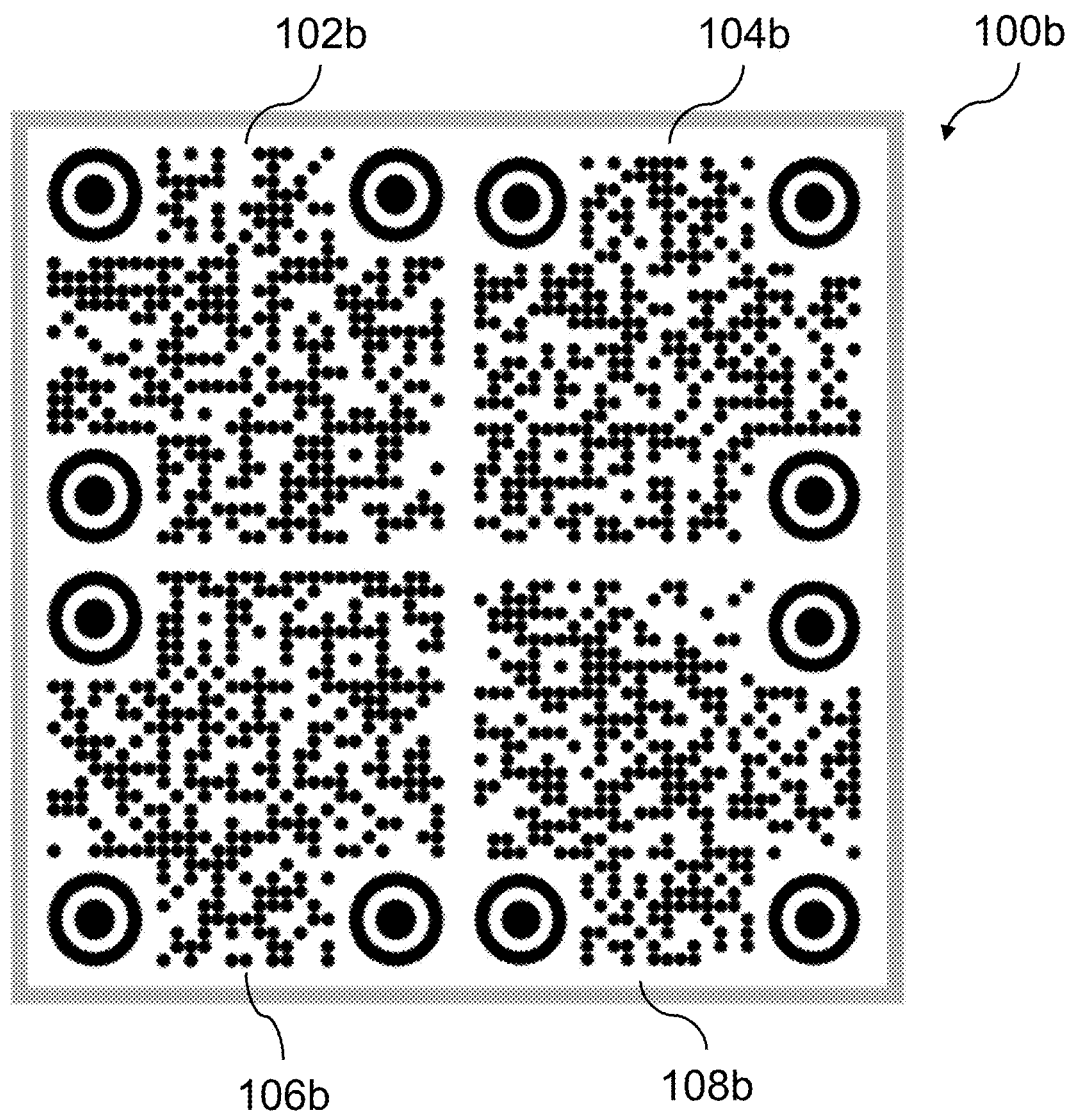
FIG. 1b: An exemplary object identification code in accordance with embodiments of the present disclosure.

FIG. 1b illustrates an exemplary object identification code 100b in accordance with an exemplary embodiment. The object identification code 100b may be attachable to a physical object. As can be seem, the object identification code 100b comprises four (i.e., a plurality) machine-readable optical codes 102b-108b. Each of the plurality of optical codes 102b-108b may be configured to encode a unique identifier of the physical object. Each of the plurality of optical codes 102b-108b may be configured to be independently scannable by a camera of an electronic device and to cause, upon being scanned, an object identification procedure to be performed by an object identification application of the electronic device. The optical codes 102b-108b may be configured to be dynamically linkable to each other to form a predetermined scan pattern for at least one of verifying authenticity of the physical object and/or reaching a target address associated with the physical object. As can be seen, the optical codes 102b-108b are arranged adjacent to each other. In this example, the optical codes 102b-108b are arranged adjacent to each to form a square of optical codes. Other types of forms are also possible and may depend on properties of the physical object (e.g., size, shape, object type etc.).

Figure 2A:
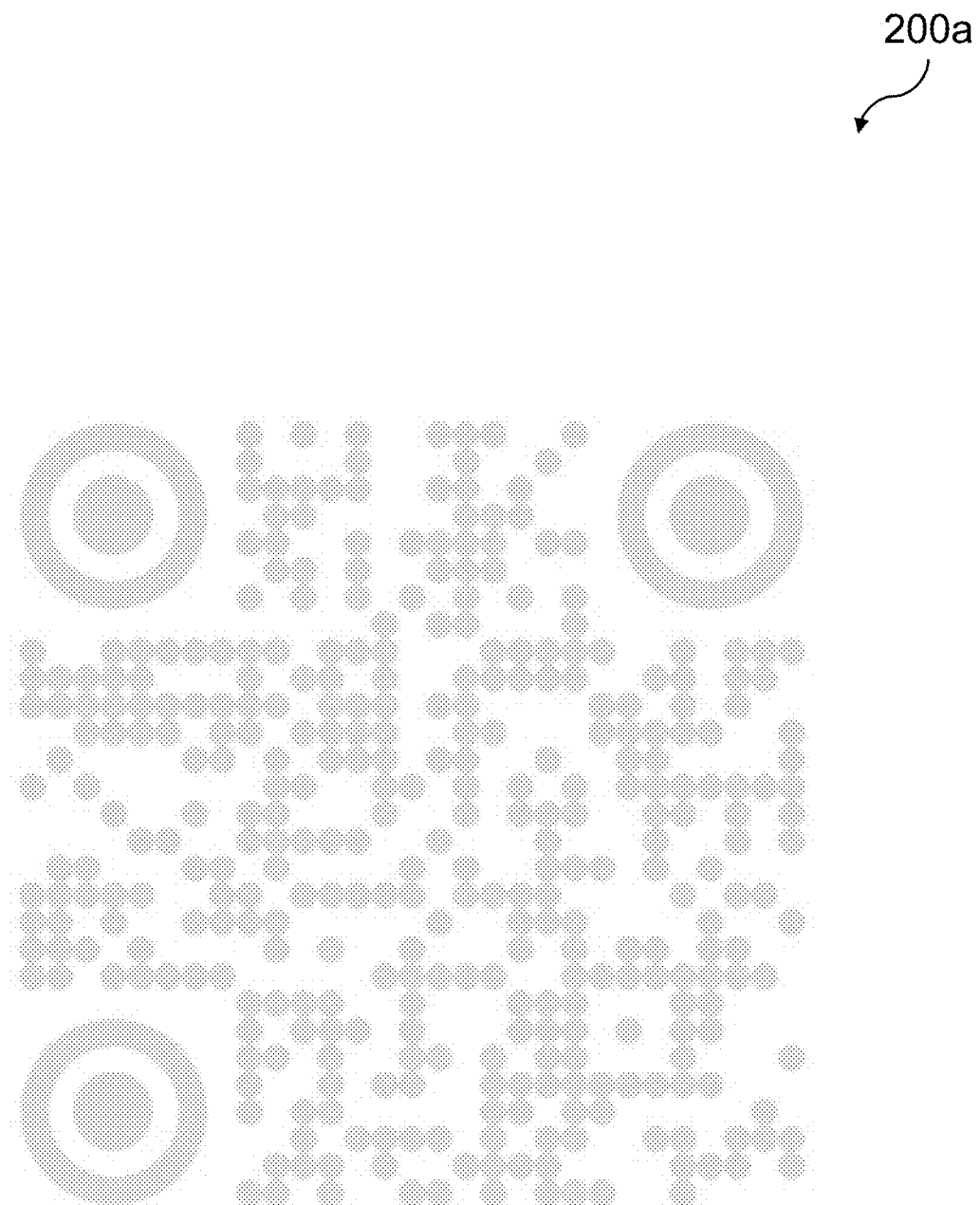
FIG. 2a: An exemplary first layer of identification marks in accordance with embodiments of the present disclosure.

FIG. 2a illustrates an exemplary first layer of identification marks 200a in accordance with an exemplary embodiment. As explained above, each optical code (e.g., optical codes 102a-108a and 102b-108b) may comprise a first layer of identification marks 200a configured to cause start of the object identification application upon being scanned. The first layer of identification marks 200a may be scannable by a common optical code scanner. In other words, the first layer of identification marks 200a may be seen as a common optical code. However, other than in the prior art where scanning of such a code (i.e., of the corresponding first layer of identification mark 200a) would result in a direct access to a target address, scanning of the first layer of identification marks 200a now causes start of the object identification application.

Figure 2B:
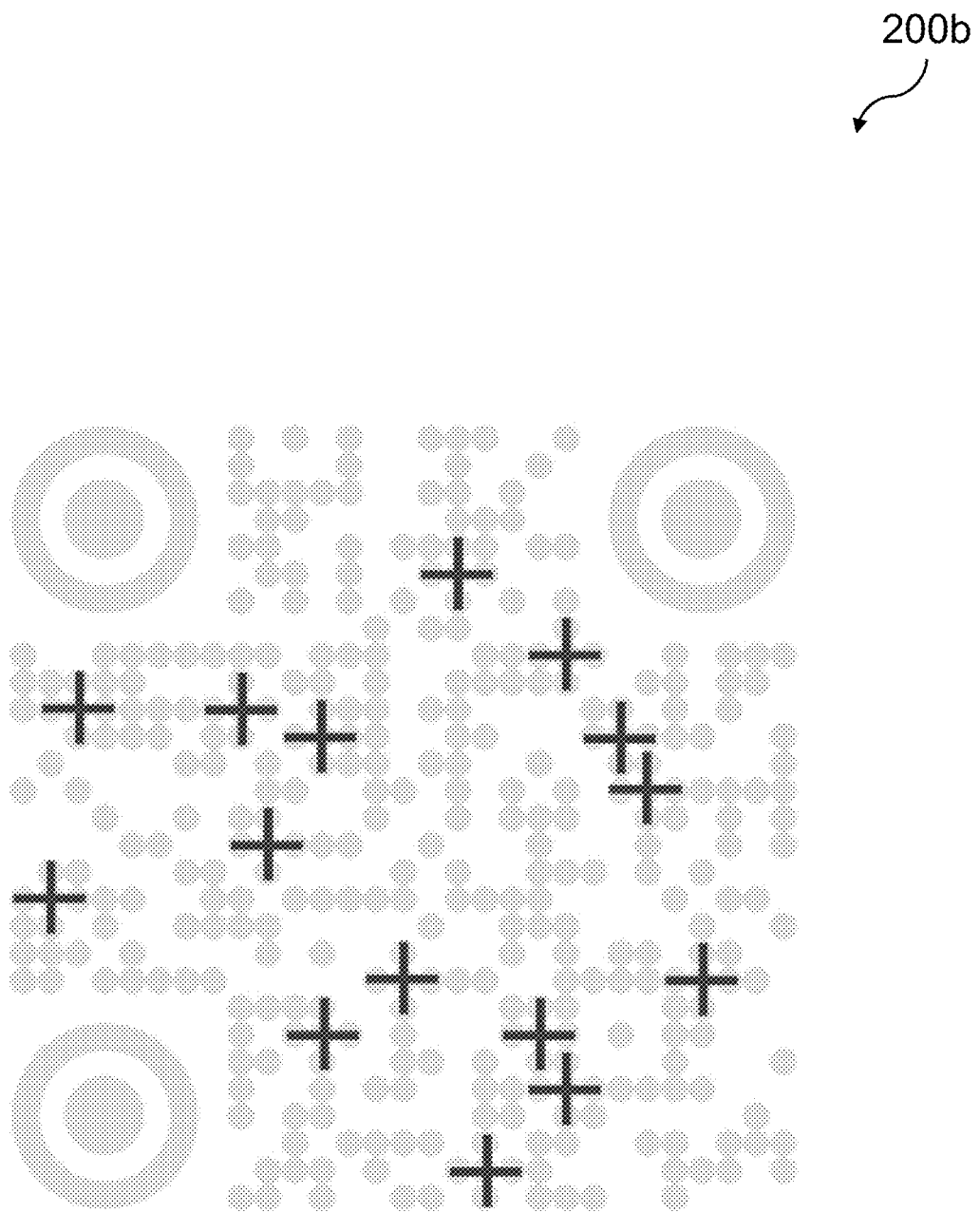
FIG. 2b: An exemplary second layer of identification marks providing dedicated information in accordance with embodiments of the present disclosure.

FIG. 2b illustrates an exemplary second layer of identification marks 200b providing dedicated information in accordance with an exemplary embodiment. As explained above, each optical code (e.g., optical codes 102a-108a and 102b-108b) may further comprise a second layer of identification marks 200b configured to provide dedicated information for the object identification procedure upon being scanned. The second layer of identification marks 200b may only be scannable by an optical code scanner of the object identification application.

As can be seen, each optical code has individual points (i.e., a first layer of identification marks) resulting in individual constellations that can be combined with graphic elements (i.e., a second layer of identification marks). In the illustrated example, these graphical elements may be crosses, which can be placed onto the first layer of identification marks 200a. It is to be understood that also other graphical elements (e.g., simple shapes such as squares but also more complex shapes such as company logos or the like) or a combination of different graphical elements (e.g., crosses and squares) can be used as long as placing these elements does not affect the readability of the first layer of identification marks 200a. This is important because otherwise a first scan of one of the optical codes in which the first layer of identification marks 200a is scanned would not work with a common optical code scanner (e.g., a camera of a smartphone). However, by placing the second layer of identification marks 200b in the described manner, a common optical scanner can perform a first scan of the optical code in which the first layer of identification marks 200a is scanned and thus cause the start of the object identification application in which then a follow up scan may be performed with an optical code scanner of the object identification application (i.e., an optical code scanner which is configured to perform additional object detection steps) in which the second layer of identification marks 200b is scanned and used to determine whether the physical object is an authentic object.

Figure 2C:
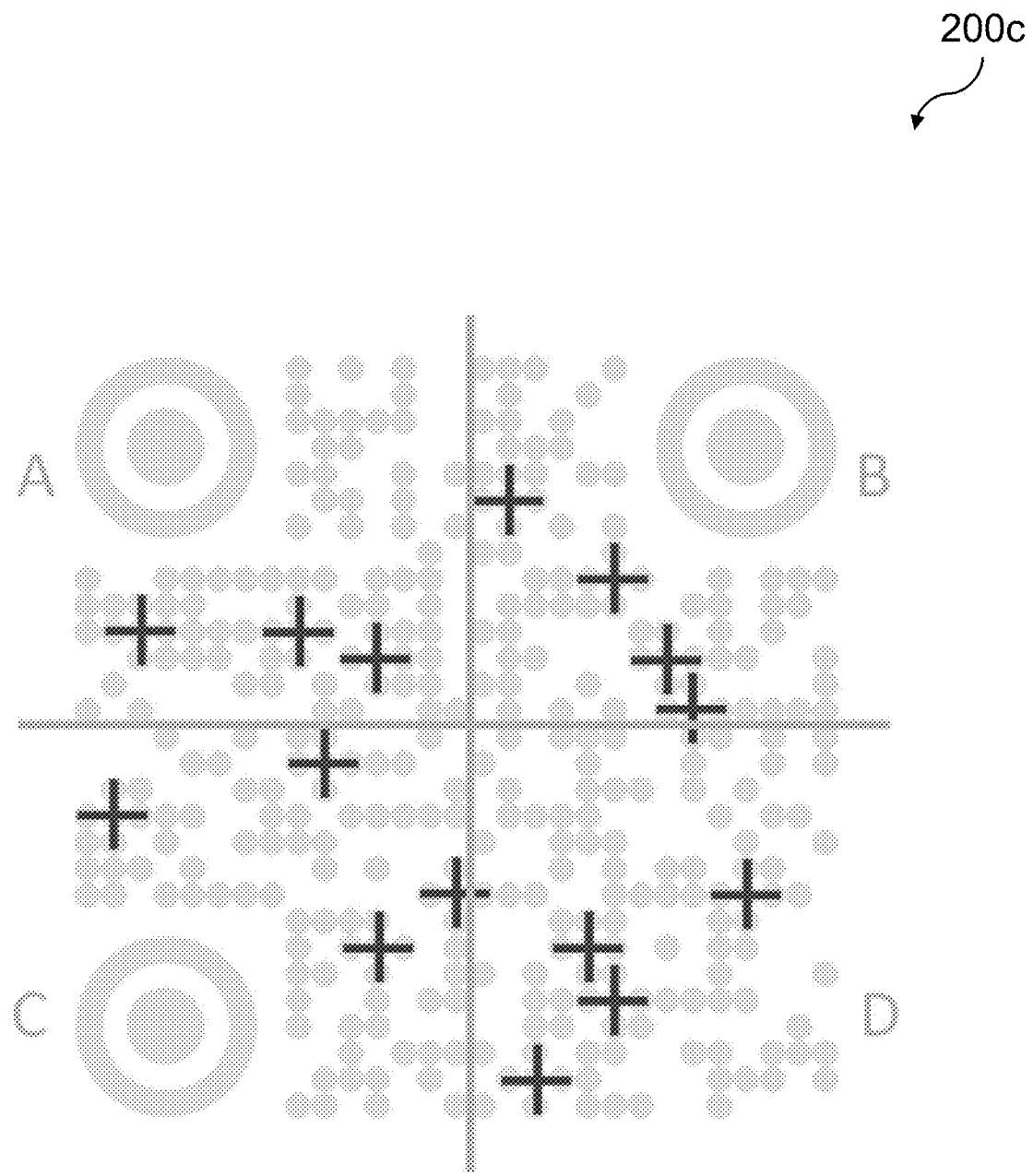
FIG. 2c: An exemplary for an object identification procedure utilizing the dedicated information provided by the second layer of identification marks in accordance with embodiments of the present disclosure.

FIG. 2c illustrates an exemplary for an object identification procedure 200c utilizing the dedicated information provided by the second layer of identification marks 200b in accordance with an exemplary embodiment. In this example, the dedicated information may refer to information associated with the crosses placed onto the first layer of identification marks 200a. How this information is utilized in the object identification procedure may be dynamically defined and/or defined on an individual level (e.g., user, user group, project, company etc.).

For example, the object identification procedure may first divide the optical code into four quadrants A, B, C and D. It may then for example determine how many crosses are placed within quadrant D. Additionally or alternatively, it may determine how many crosses are there in total. Additionally or alternatively, it may also determine how many crosses are tangent to two or more quadrants. In case a combination of graphical elements us used (e.g., crosses and squares), it may (also) determine how many different graphical elements are present.

As can be seen, there are an exponential number of combinations possible not only with respect to defining the second layer of identification marks 200b (i.e., which type(s) of elements and where to place them) but also with respect to validation questions (i.e., number of (different) elements, their position(s) etc.).

Figure 3:
FIG. 3: An example of pairing an object identification code with a non-visual mark in accordance with embodiments of the present disclosure.

FIG. 3 illustrates an example 300 of pairing an object identification code 302 with a non-visual mark 304 in accordance with an exemplary embodiment. In the illustrated example 300, the object identification code 302 comprises a plurality of optical codes. In the illustrated example 300, the physical object is a syringe. As can be seen, the optical codes are arranged in a ring shape to reach around the object. This means that the plurality of optical codes comprises at least a first optical code and a second optical code which are arranged on the syringe such that when the first optical code is located within a scannable camera view of an electronic device, the second optical code is located outside of the scannable camera view of the electronic device (e.g., on the opposing side of the syringe). Of course, the optical codes may also be arranged in another suitable shape to reach around the physical object.

During the object identification procedure at least the first optical code and the second optical code may be required to be scanned according to a predetermined scan pattern. It is also possible that the optical codes are arranged such that from a first view angle onto the object a first set of object-related codes is detectable and that from a second view angle onto the object a second set of object-related codes is detectable. The first and second set may be different or partially overlapping.

In addition, attaching the object identification code 302 in the arranged manner on a physical object may allow to scan at least one optical code from each view angle onto the physical object. In addition, the object identification code 302 according to the present disclosure may be attached to a physical object irrespective of the shape or surface of the object (i.e., other than common optical codes, the object identification code of the present disclosure may also be attached to a curved surface).

Pairing the object identification code 302 with the non-visual mark 304 (e.g., NFC mark) may further improve robustness and security of the object identification procedure because the non-visual mark is only attached to an authentic object and may thus transmit, upon receiving a request, a corresponding response based on which it can be determined that the physical object is the authentic object.

Figure 4:
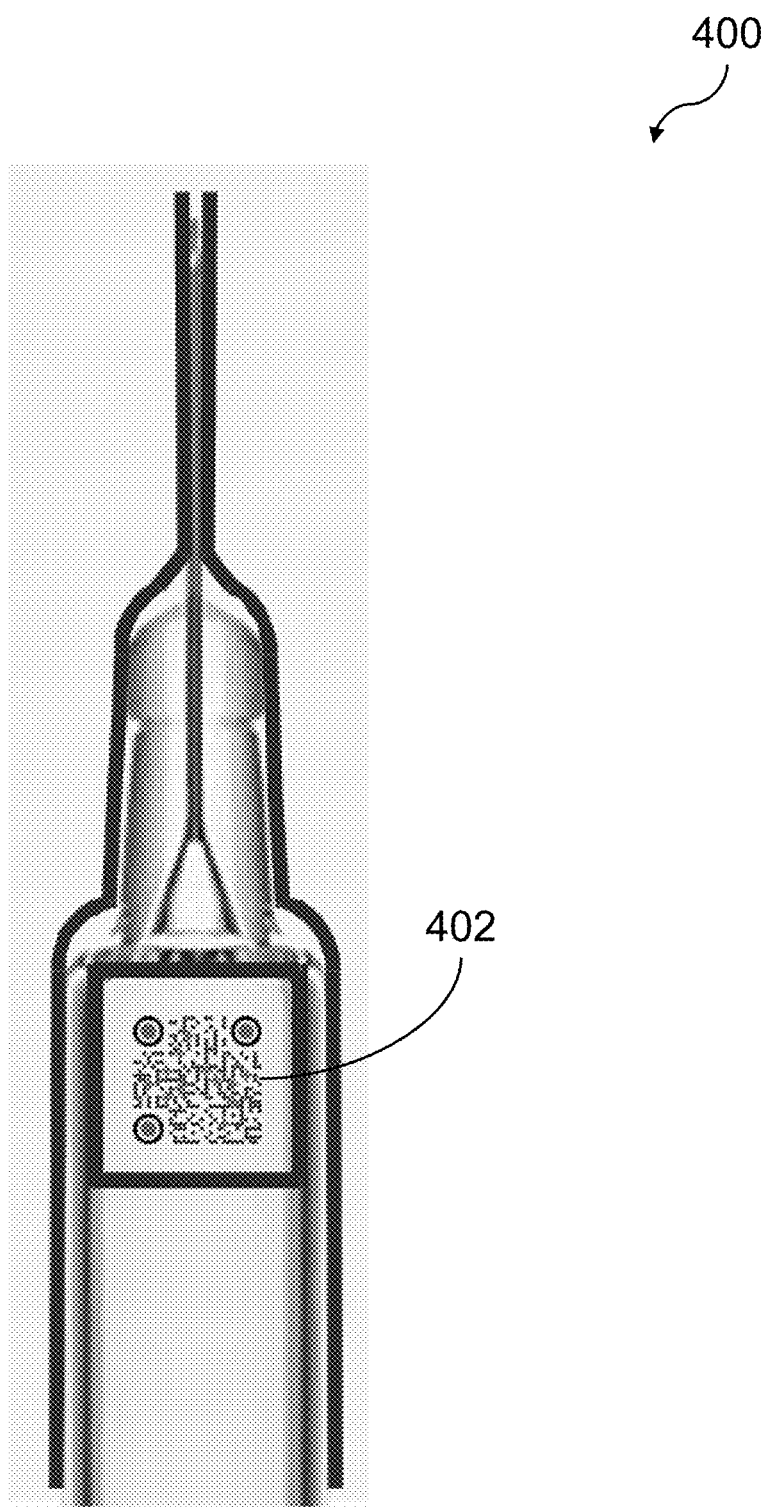
FIG. 4: A first example of an object detection step in accordance with embodiments of the present disclosure.

FIG. 4 illustrates a first example of an object detection step 400 in accordance with an exemplary embodiment. The object detection step 400 may allow to determine whether the detected physical object is an authentic object or an inauthentic object. As part of the object detection step 400, one or more properties of the physical object may be compared with corresponding one or more properties of the authentic object.

For example, upon receiving an indication that at least one optical code 402 was scanned, start of an object identification procedure may be caused. For illustrative purposes, only one optical code 402 is shown. A corresponding object identification application performing the object identification procedure is started and the object detection step 400 is performed (e.g., using an optical code scanner of the object identification application which is configured to perform the object detection step 400). The object detection step 400 may then compare whether one or more properties of the detected physical object match one or more properties of the authentic object associated with said object detection code comprising the optical code 402.

In this example, the physical object is a syringe. The object detection step 400 may thus compare whether the object detection code comprising the optical code 402 is associated with a syringe. In other words, it is compared whether the object type of the detected physical object (e.g., syringe) matches the object type of the authentic object. Other properties may relate to the positioning of the one or more optical codes on the physical object, size, optical or visual cues of the physical object and/or dimensions of the detected physical object.

Figure 5:
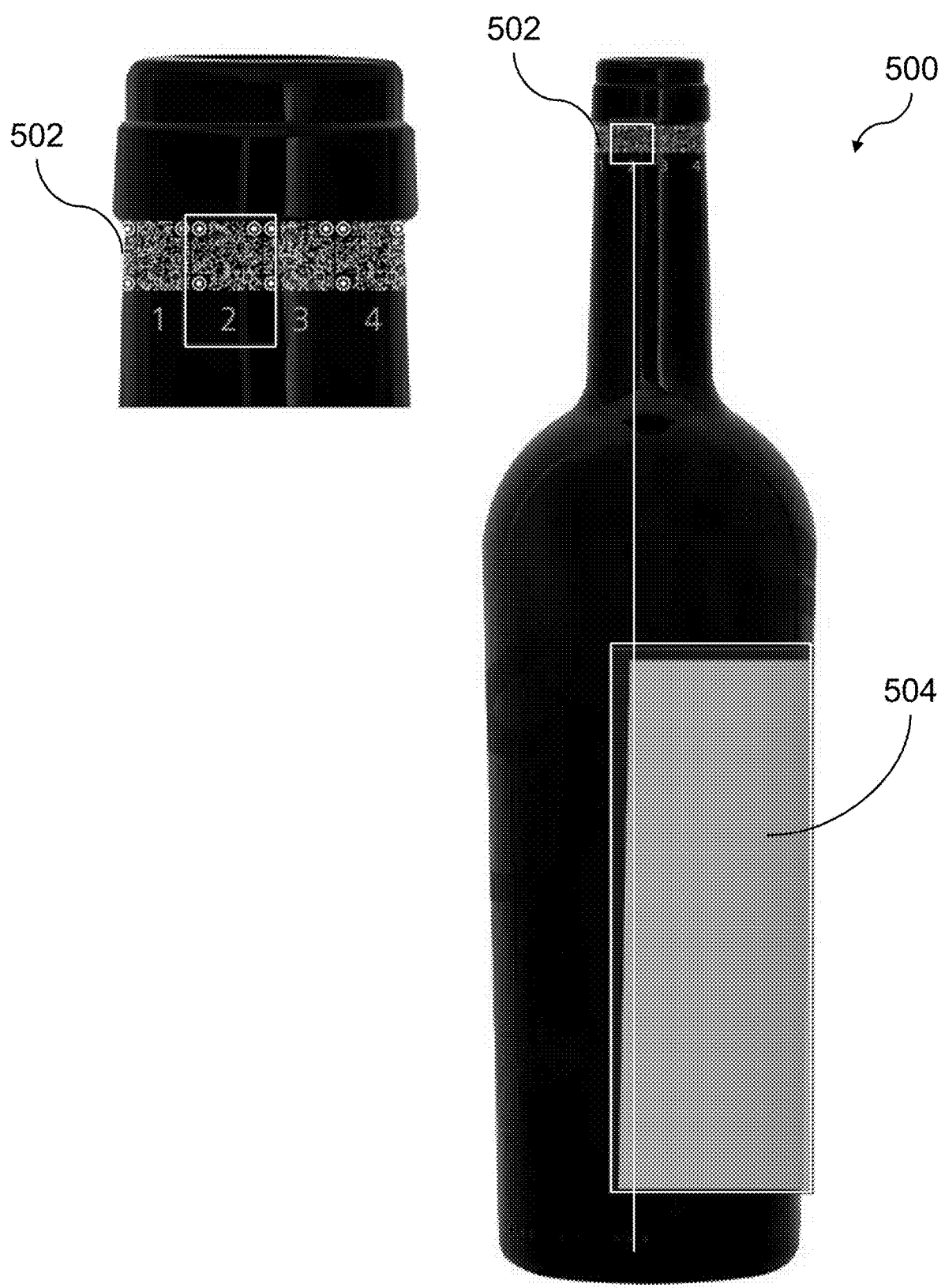
FIG. 5: A second example of an object detection step in accordance with embodiments of the present disclosure.

FIG. 5 illustrates a second example of an object detection step 500 in accordance with an exemplary embodiment. In the illustrated example, the physical object is a bottle. A corresponding object identification code 502 is attached to the bottleneck of the bottle. The object identification code comprises a plurality of optical codes which are arranged adjacent to each other and in a ring-shape to reach around the bottle. From a certain point of view, a set of four optical codes (i.e., optical code 1, optical code 2, optical code 3 and optical code 4) are detectable. In this example, optical code 2 is associated with a visual cue of the physical object, namely the label 504 of the bottle.

In order to determine whether the bottle is an authentic object, the object detection step 500 may determine whether the optical code 2 is correctly positioned on the bottleneck with respect to the label 504. In the illustrated example, it would be determined that the bottle is an inauthentic object, because a bounding box of the label 504 intersects a vertical line drawn from the position of the optical code 2. Accordingly, if the vertical line would not intersect with the bounding box, it may be determined that the bottle is an authentic object.

Figure 6:
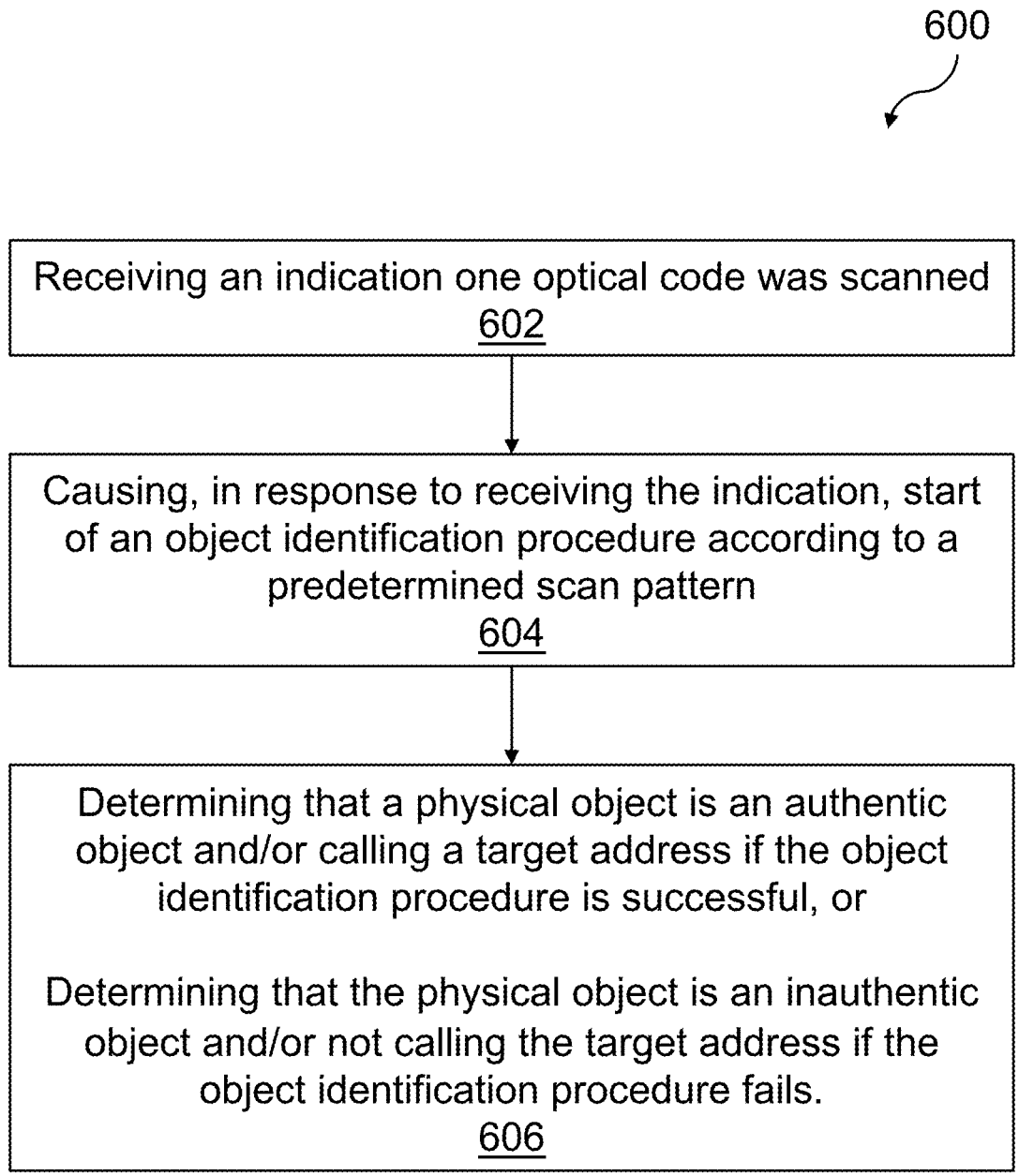
FIG. 6: A flow chart of a method for identifying a physical object using an object identification code in accordance with embodiments of the present disclosure.

FIG. 6 illustrates a flow chart of a method 600 for identifying a physical object using an object identification codes 100*a-b* in accordance with an exemplary embodiment.

The method 600 for identifying a physical object using an object identification code comprise a step of receiving 602 an indication that at least one optical codes of a plurality of optical codes (e.g., the optical codes 102*a*-108*a* or 102*b*-108*b*) was scanned.

For example, a user may scan using an optical scanner (e.g., a camera) of an electronic device (e.g., smartphone or another suitable optical scanner) at least one (i.e., one or more) optical codes. The one or more scanned optical codes are configured to cause start of an object identification procedure performed by an object identification application of the electronic device. For example, an URL may be called which causes start of the object identification application or in case the object identification application is not yet installed a prompt to install the object identification application (which may require a corresponding user registration) or in case the object identification application is not yet installed a direct download/installation link. It may also be possible that only a registration is required (e.g., in case the object identification application is implemented as web application). In case a corresponding user registration is implemented, the user may be assigned with a unique user ID which may be incorporated into the object identification procedure. For example, said ID may be integrated into the scan pattern (e.g., by either prompting the user to enter his ID or by reducing the amount of scans of the scan pattern if a user ID can be provided.

The method 600 may comprise a step of causing 604, in response to receiving the indication, start of an object identification procedure according to a predetermined scan pattern for at least one of verifying authenticity of the physical object and/or reaching a target address associated with the physical object.

Once the object identification application is ready (i.e., installed or at least ready to start), a (first) scan of at least one optical code may cause the start of the object identification procedure. As part of this object identification procedure, the predetermined scan pattern is required to match the optical codes presented to the optical scanner. For this purpose, one or more prompts to scan one or more of the optical codes according to the predetermined scan pattern may be issued. For example, a user may be prompted to rotate the object such that other optical codes are within the view angle of the optical scanner. In case the optical scanner detects the corresponding optical code (e.g., the first optical code of the predetermined scan pattern upon start of the object identification procedure), the optical scanner may search for the next optical code of the predetermined scan pattern for which again corresponding prompts (e.g., rotate object) may be issued. This may be repeated until each optical code included in the predetermined scan pattern was scanned. Other prompts may prompt the scan of a particular optical code (e.g., scan the optical code at a certain position on the physical object) or may prompt the scan of the physical object from a certain view angle (e.g., scan the physical object with the label facing you frontal) which may allow to detect whether specific optical codes are positioned correctly with respect to visual cues of the physical objects.

The method 600 may comprise a step of determining 606 that the physical object is an authentic object and/or calling the target address if the object identification procedure is successful or determining that the physical object is an inauthentic object and/or not calling the target address if the object identification procedure fails.

In some embodiments in which more than one optical code is scanned at once (e.g., using an optical scanner capable of scanning multiple codes at once), the indication received may indicate that two or more optical codes of the plurality of optical codes were scanned.

In some embodiments, the object identification procedure may comprises causing one or more prompts to scan one or more optical codes according to the predetermined scan pattern, which is dynamically configurable for linking the optical codes to each other. Additionally or alternatively, at least a first optical code and a second optical code may both be required to be scanned according to the predetermined scan pattern. The first optical code and the second optical code may be arranged on the physical object such that when the first optical code is located within a scannable camera view of an electronic device, the second optical code is located outside of the scannable camera view of the electronic device. The electronic device may be a smartphone or any other suitable optical scanner which is capable of scanning one or more optical codes.

In some embodiments, the object identification procedure further may comprise performing an object detection step to determine whether the detected physical object is the authentic object or the inauthentic object. The object detection step may comprise comparing one or more properties of the physical object with corresponding one or more properties of the authentic object.

In some embodiments, the object identification procedure may further comprise performing an object detection step to determine whether a specific optical code is arranged correctly on the physical object with respect to a visual cue of the physical object.

In some embodiments, the object identification procedure may further comprise receiving, when a second layer of identification marks of an optical code has been scanned, dedicated information for the object identification procedure. The object identification procedure may further comprise determining whether the physical object is the authentic or inauthentic object based on the dedicated information.

In some embodiments, the object identification procedure may further comprise transmitting a request to a non-visual mark which was attached to the authentic object. The object identification procedure may further comprise determining that the physical object is the authentic object if a response to the request is received.

Figure 7:
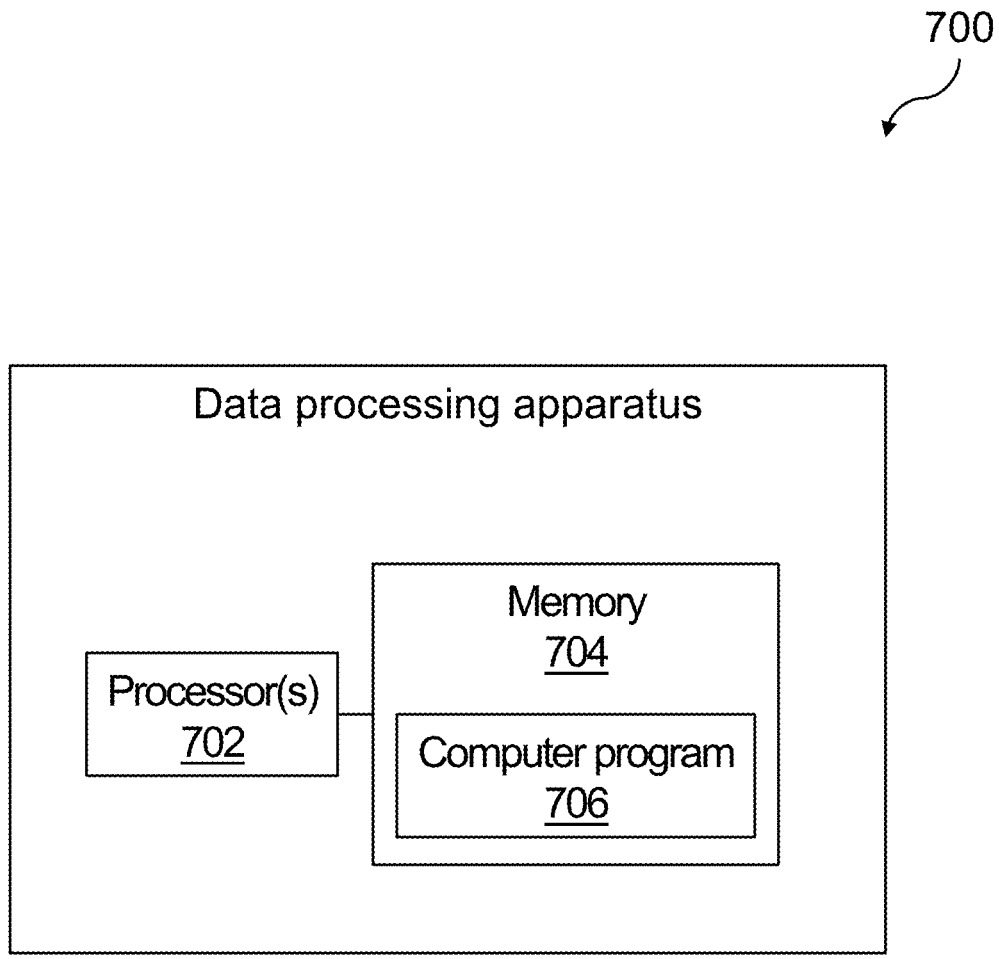
FIG. 7: A structural diagram of a data processing apparatus in accordance with embodiments of the present disclosure.

FIG. 7 illustrates a structural diagram of a data processing apparatus 700 in accordance with an exemplary embodiment.

The apparatus 700 may comprise a memory 704 and one or more processors 702, coupled to the memory 704. The one or more processors 702 may be configured to receive an indication that at least one of a plurality of object-related codes was scanned. The one or more processors 702 may be configured to cause, in response to receiving the indication, start of an object identification procedure according to a predetermined scan pattern for at least one of verifying authenticity of a physical object; and/or reaching a target address associated with the physical object. The one or more processors 702 may be configured to determine that the physical object is an authentic object and/or calling the target address if the object identification procedure is successful or determine that the physical object is an inauthentic object and/or not calling the target address if the object identification procedure fails. The one or more processors 702 may be further configured to perform the method according to any one of the aspects described herein (e.g., method 600 as described with respect to FIG. 6).

The apparatus 700 may also comprise a non-transitory computer-readable medium storing a set of instructions 706 that, when executed by one or more processors 702 of the apparatus 700, cause the apparatus 700 to receive an indication that at least one of a plurality of object-related codes was scanned, causing, in response to receiving the indication, start of an object identification procedure according to a predetermined scan pattern for at least one of verifying authenticity of a physical object; and/or reaching a target address associated with the physical object and determine that the physical object is an authentic object and/or calling the target address if the object identification procedure is successful or determine that the physical object is an inauthentic object and/or not calling the target address if the object identification procedure fails. The non-transitory computer-readable medium storing the set of instructions 706 may also be located separately from the apparatus 700.

In some alternative implementations, the apparatus 700 may comprise means for performing the method of any one of the aspects described herein (e.g., the method 600 as described with respect to FIG. 6).

Some alternative implementations may relate to a computer program 706 comprising instructions which when executed by a computer cause the computer to perform the method of any one of the aspects described herein (e.g., method 600).

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Embodiments of the present disclosure may be implemented on a computer system. The computer system may be a local computer device (e.g., personal computer, laptop, tablet computer or mobile phone) with one or more processors and one or more storage devices or may be a distributed computer system (e.g., a cloud computing system with one or more processors and one or more storage devices distributed at various locations, for example, at a local client and/or one or more remote server farms and/or data centers). The computer system may comprise any circuit or combination of circuits. In one embodiment, the computer system may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), or any other type of processor or processing circuit. Other types of circuits that may be included in the computer system may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system may include one or more storage devices, which may include one or more memory elements suitable to the particular application, such as a main memory in the form of random-access memory (RAM), one or more hard drives, and/or one or more drives that handle removable media such as compact disks (CD), flash memory cards, digital video disk (DVD), and the like. The computer system may also include a display device, one or more speakers, and a keyboard and/or controller, which can include a mouse, trackball, touch screen, voice-recognition device, or any other device that permits a system user to input information into and receive information from the computer system.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the present disclosure can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the present disclosure comprise a data carrier having electronically readable control signals, which are capable of cooperating with a programmable computer system, such that one of the methods described herein is performed.

Generally, embodiments of the present disclosure can be implemented as a computer program product with a program code, the program code being operative for performing one of the methods when the computer program product runs on a computer. The program code may, for example, be stored on a machine-readable carrier.

Other embodiments comprise the computer program for performing one of the methods described herein. The computer program may be stored on a machine-readable carrier.

In other words, an embodiment of the present disclosure is, therefore, a computer program having a program code for performing one of the methods described herein, when the computer program runs on a computer.

A further embodiment of the present disclosure is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitory. A further embodiment of the present disclosure is an apparatus as described herein comprising a processor and the storage medium.

A further embodiment of the present disclosure is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the present disclosure comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The invention claimed is:

1. An object identification code attachable to a physical object, the object identification code comprising:
   (a) a plurality of machine-readable optical codes;
   (b) wherein each of the plurality of optical codes is configured to encode a unique identifier of the physical object;
   (c) wherein each of the plurality of optical codes is configured to be independently scannable by a camera of an electronic device and to cause, upon being scanned, an object identification procedure to be performed by an object identification application of the electronic device; and
   (d) wherein the optical codes are configured to be dynamically linkable to each other to form a predetermined scan pattern for at least one of:
   verifying authenticity of the physical object; and/or
   reaching a target address associated with the physical object;
   wherein the optical codes are arranged adjacent to each other; and/or
   wherein the plurality of optical codes comprises at least a first optical code and a second optical code both required to be scanned during the object identification procedure according to the predetermined scan pattern, wherein the first optical code and the second optical code are arranged on the physical object such that when the first optical code is located within a scannable camera view of the electronic device, the second optical code is located outside of the scannable camera view of the electronic device; and/or
   wherein the optical codes are arranged such that from a first view angle onto the object a first set of object-related codes is detectable and that from a second view angle onto the object a second set of object-related codes is detectable; and
   wherein the optical codes are arranged in a ring shape to reach around the object.

2. The object identification code of claim 1, wherein a position of at least one optical code on the physical object is associated with a visual cue of the physical object.

3. A method for identifying a physical object using an object identification code, in particular an object identification code according to claim 1, the method comprising:
   (a) receiving an indication that at least one of the optical codes was scanned;
   (b) causing, in response to receiving the indication, start of an object identification procedure according to a predetermined scan pattern for at least one of:
   verifying authenticity of the physical object; and/or
   reaching a target address associated with the physical object;
   (c) determining that the physical object is an authentic object and/or calling the target address if the object identification procedure is successful or
   determining that the physical object is an inauthentic object and/or not calling the target address if the object identification procedure fails;
   wherein the object identification procedure further comprises:
   receiving, when a second layer of identification marks of an optical code has been scanned, dedicated information for the object identification procedure; and
   determining whether the physical object is the authentic or inauthentic object based on the dedicated information.

4. The method of claim 3, wherein the object identification procedure comprises:
   causing one or more prompts to scan one or more optical codes according to the predetermined scan pattern, which is dynamically configurable for linking the optical codes to each other; and/or
   wherein at least a first optical code and a second optical code are both required to be scanned according to the predetermined scan pattern, wherein the first optical code and the second optical code are arranged on the physical object such that when the first optical code is located within a scannable camera view of an electronic device, the second optical code is located outside of the scannable camera view of the electronic device.

5. The method of claim 3, wherein the object identification procedure further comprises:
   performing an object detection step to determine whether the detected physical object is the authentic object or the inauthentic object;
   wherein the object detection step comprises: comparing one or more properties of the physical object with corresponding one or more properties of the authentic object.

6. The method of claim 3, wherein the object identification procedure further comprises:
   performing an object detection step to determine whether a specific optical code is arranged correctly on the physical object with respect to a visual cue of the physical object.

7. The method of claim 3, wherein the object identification procedure further comprises:
   transmitting a request to a non-visual mark which was attached to the authentic object; and
   determining that the physical object is the authentic object if a response to the request is received.

8. An object identification code attachable to a physical object, the object identification code comprising:
   (a) a plurality of machine-readable optical codes;
   (b) wherein each of the plurality of optical codes is configured to encode a unique identifier of the physical object;

(c) wherein each of the plurality of optical codes is configured to be independently scannable by a camera of an electronic device and to cause, upon being scanned, an object identification procedure to be performed by an object identification application of the electronic device; and (d) wherein the optical codes are configured to be dynamically linkable to each other to form a predetermined scan pattern for at least one of:

verifying authenticity of the physical object; and/or reaching a target address associated with the physical object;

wherein each optical code comprises:

a first layer of identification marks configured to cause start of the object identification application upon being scanned; and a second layer of identification marks configured to provide dedicated information for the object identification procedure upon being scanned.

9. The object identification code of claim 8, wherein the first layer of identification marks is scannable by a common optical code scanner; and wherein the second layer of identification marks is only scannable by an optical code scanner of the object identification application.

10. An apparatus, comprising:

a memory; and one or more processors, coupled to the memory, configured to:

(a) receive an indication that at least one of a plurality of object-related codes was scanned;

(b) cause, in response to receiving the indication, start of an object identification procedure according to a predetermined scan pattern for at least one of:

verifying authenticity of a physical object; and/or reaching a target address associated with the physical object;

(c) determine that the physical object is an authentic object and/or calling the target address if the object identification procedure is successful or determine that the physical object is an inauthentic object and/or not calling the target address if the object identification procedure fails;

wherein the one or more processors are further configured to cause the object identification procedure to:

receive, when a second layer of identification marks of an optical code has been scanned, dedicated information for the object identification procedure; and determine whether the physical object is the authentic or inauthentic object based on the dedicated information.

11. A non-transitory computer-readable medium storing a set of instructions that, when executed by one or more processors of an apparatus, cause the apparatus to:

(a) receive an indication that at least one of a plurality of object-related codes was scanned;

(b) causing, in response to receiving the indication, start of an object identification procedure according to a predetermined scan pattern for at least one of:

verifying authenticity of a physical object; and/or reaching a target address associated with the physical object;

(c) determine that the physical object is an authentic object and/or calling the target address if the object identification procedure is successful or determine that the physical object is an inauthentic object and/or not calling the target address if the object identification procedure fails;

wherein the one or more processors are further configured to cause the object identification procedure to:

receive, when a second layer of identification marks of an optical code has been scanned, dedicated information for the object identification procedure; and determine whether the physical object is the authentic or inauthentic object based on the dedicated information.

\* \* \* \* \*